United States Patent
Asada

(10) Patent No.: US 10,227,239 B2
(45) Date of Patent: Mar. 12, 2019

(54) METHOD FOR PRODUCING BARIUM SULFATE POWDER AND BARIUM SULFATE POWDER

(71) Applicant: SAKAI CHEMICAL INDUSTRY CO., LTD., Osaka (JP)

(72) Inventor: Masayuki Asada, Fukushima (JP)

(73) Assignee: SAKAI CHEMICAL INDUSTRY CO., LTD., Sakai-shi, Osaka ( * ) Notice: Subject to any disclaimer, the term of this patent is extended or adjusted under 35 U.S.C. 154(b) by 0 days.

(21) Appl. No.: 15/524,163

(22) PCT Filed: Nov. 6, 2015

(86) PCT No.: PCT/JP2015/081351
§ 371 (c)(1),
(2) Date: May 3, 2017

(87) PCT Pub. No.: WO2016/076230
PCT Pub. Date: May 19, 2016

(65) Prior Publication Data
US 2017/0320750 A1 Nov. 9, 2017

(30) Foreign Application Priority Data
Nov. 10, 2014 (JP) ................................ 2014-228122

(51) Int. Cl.
*C01F 11/46* (2006.01)
*C09C 1/02* (2006.01)

(52) U.S. Cl.
CPC ............ *C01F 11/462* (2013.01); *C09C 1/027* (2013.01); *C01P 2004/03* (2013.01); *C01P 2004/10* (2013.01); *C01P 2004/20* (2013.01); *C01P 2004/38* (2013.01); *C01P 2004/61* (2013.01); *C01P 2004/62* (2013.01); *C01P 2004/80* (2013.01); *C01P 2006/37* (2013.01); *C01P 2006/62* (2013.01); *C01P 2006/63* (2013.01); *C01P 2006/64* (2013.01); *C01P 2006/80* (2013.01)

(58) Field of Classification Search
CPC . C01F 11/462; C01P 2004/03; C01P 2004/20; C01P 2004/10; C01P 2004/38
See application file for complete search history.

(56) References Cited

U.S. PATENT DOCUMENTS

| | | | | |
|---|---|---|---|---|
| 1,468,867 A | * | 9/1923 | Pierce, Jr. ............. | C01F 11/462 106/401 |
| 2,094,902 A | * | 10/1937 | Muller .................. | C01F 11/462 423/554 |
| 5,580,377 A | * | 12/1996 | Ohtsu ...................... | A61K 8/19 106/415 |
| 2010/0162922 A1 | | 7/2010 | Ono et al. | |
| 2010/0255308 A1 | | 10/2010 | Vogler et al. | |
| 2011/0220169 A1 | | 9/2011 | Okawara et al. | |
| 2015/0056289 A1 | | 2/2015 | Ueda | |

FOREIGN PATENT DOCUMENTS

| | | | | |
|---|---|---|---|---|
| CN | 103130260 A | 6/2013 | | |
| JP | 57-145031 | 9/1982 | | |
| JP | 57-145031 A | 9/1982 | | |
| JP | 58-041718 | 3/1983 | | |
| JP | 58-041718 A | 3/1983 | | |
| JP | 1994-234518 | 8/1994 | | |
| JP | H06-234518 | 8/1994 | | |
| JP | H10-8028 | 1/1998 | | |
| JP | H108028 | 1/1998 | | |
| JP | H11-35319 | 2/1999 | | |
| JP | H11-035319 A | 2/1999 | | |
| JP | H11-71110 | 3/1999 | | |
| JP | H1171110 | 3/1999 | | |
| JP | 2008-050261 | 6/2008 | | |
| JP | 2008050261 A | 6/2008 | | |
| JP | 2010-533635 A | 10/2010 | | |
| JP | 55 75800 B2 | * | 8/2014 | ............ C01F 11/462 |
| WO | 2007/069353 | 6/2007 | | |
| WO | 2010/005029 | 1/2010 | | |
| WO | WO 2010 078821 A1 | * | 7/2010 | ............ C01F 11/462 |
| WO | 2013/129292 A1 | 9/2013 | | |

OTHER PUBLICATIONS

International Search Report and Written Opinion, International Patent Application No. PCT/JP2015/081351, Dec. 8, 2015, with English translation of Search Report (9 pages).

* cited by examiner

*Primary Examiner* — Timothy C Vanoy
(74) *Attorney, Agent, or Firm* — Hamre, Schumann, Mueller & Larson, P.C.

(57) ABSTRACT

It is an object of the present disclosure to provide a method for inexpensively producing a high-performance barium sulfate powder which is obtained by using inexpensive barium sulfide as a raw material, has a high whiteness degree, and can suppress the generation of volatile components. A method for producing a barium sulfate powder comprises a step of heat treating a raw barium sulfate powders obtained by using barium sulfide as a raw material at 600 to 1300° C., wherein a retention time X (minutes) at a heat treatment temperature of t° C. is more than time expressed by the following general formula: X (minutes)= $A \times 10^6 \times e^{(-0.015 \times t)}$, where A is 8 or more, and an upper limit of X is 3000 minutes in the formula.

14 Claims, 1 Drawing Sheet

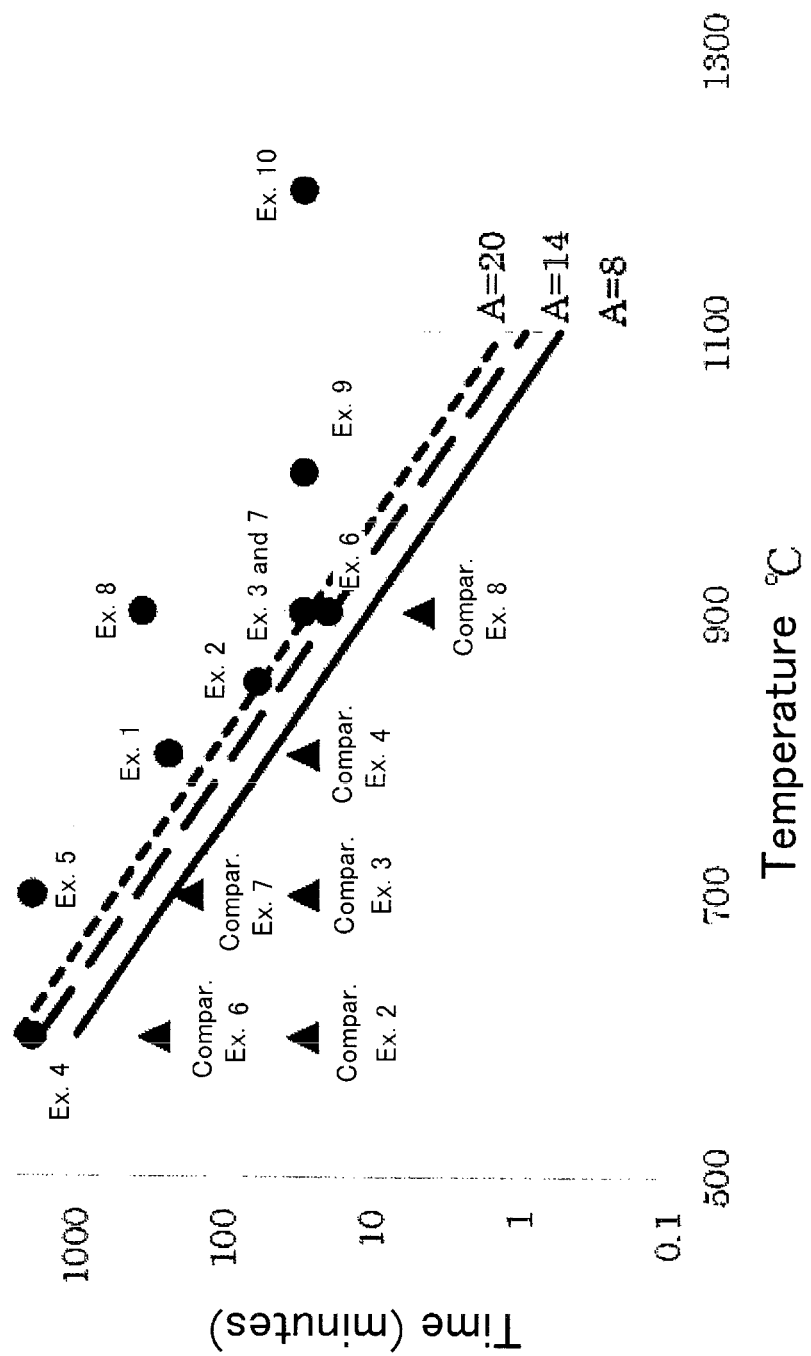

US 10,227,239 B2

METHOD FOR PRODUCING BARIUM SULFATE POWDER AND BARIUM SULFATE POWDER

TECHNICAL FIELD

The present disclosure relates to a method for producing a barium sulfate powder, and the barium sulfate powder.

BACKGROUND OF THE DISCLOSURE

A barium sulfate powder is often used as a filler of a resin composition for light reflection applications. More specifically, it is used for a back sheet of solar cells (Patent document 1), a reflection film of a backlight unit using a LED as a source of light such as liquid crystal television, and a resin composition for a case body of LED. For these applications, high whiteness is required.

To obtain barium sulfate powder having a high whiteness degree which can be used for these applications, barium chloride and barium hydroxide have been used conventionally as a starting material. However, the whiteness degree of a barium sulfate powder obtained by using barium chloride as a staring material is high but a large quantity of residual chlorides as byproduct salt is generated. On the other hand, the whiteness degree of a barium sulfate powder obtained by using barium hydroxide as a starting material is high and a content of corrosive components such as sulfur components and chlorides is low but a volatile content is more than 0.5 wt % and the problem is that electronic parts of solar cells and LED are affected by it.

To solve the problem, a barium sulfate powder synthesized by using barium sulfide as a raw material has attracted attention. The barium sulfate synthesized by using barium sulfide as a material is used not only in a coating but also especially suitably in resin compositions for an ink, a film and a sheet requiring a high dispersibility because of superior dispersibility. In addition, a content of elements such as chlorine and sodium in the barium sulfate powder is a few so that problems such as insulation reduction and corrosion of electronic devices are hardly caused when it is used as a filler. Further, barium sulfide is cheaper than barium chloride and barium hydroxide so that barium sulfide has a cost merit.

However, the requirement to the reliability of the electronic parts has been increased and minor sulfur component contained in the barium sulfate powder which is synthesized by using barium sulfide as a raw material is considered as a problem. For example, an ink and a resin composition containing the barium sulfate powder which is synthesized by using barium sulfide as a raw material may deteriorate and corrode a metal part such as an electrode in electronic parts so that the function, the durability, and the reliability of the electronic parts and solar cells and LED containing the electronic parts may be impaired. Further, the whiteness degree of the barium sulfate powder becomes low when a content of sulfur components is high. Therefore, the barium sulfate powder obtained by using barium chloride and barium hydroxide as raw material has been used even though it is expensive.

In addition, there is a problem of bad smell derived from the sulfur components. The barium sulfate powder is used in various purposes such as a coating, an ink, and an additive to a resin and a rubber. In all purposes, in processes of dispersing barium sulfate powder containing the sulfur components into water, a solvent, or a resin, an operating environment may be deteriorated by the generation of bad smell even if the degree of bad smell is extremely low.

As a method for producing a barium sulfate powder using barium sulfide as a raw material, a method for obtaining a barium sulfate powder using barium sulfide, ammonium sulfate, and sodium hydroxide is proposed (Patent document 2). However, in the barium sulfate powder obtained by such method, sodium is remained and the cost is increased because of treating byproduct nitrogen compounds.

It is known that a volatile matter content is reduced by heat treating the barium sulfate powder derived from barium sulfide (For example, [0013] and [0027] of Patent document 3, claim 4, and examples 1 to 12 of Patent document 4, and [0010] of Patent document 5). However, in these prior documents, the treating temperature is not be specified, or only a treatment with a relatively low temperature, being 300 to 800° C., is disclosed even if the temperature is specified. In such a method, it is impossible to reduce sufficiently a content of sulfur components and improve the whiteness degree. In addition, within the above-mentioned range of temperature, it is considered that powders with a high whiteness degree cannot be obtained because the whiteness is deteriorated as mentioned later according to the retention time.

PRIOR TECHNICAL DOCUMENTS

Patent Documents

[Patent Document 1] WO 2010/005029
[Patent Document 2] Japanese Kokai Publication Hei11-35319
[Patent Document 3] WO 2007/069353
[Patent Document 4] Japanese Kokai Publication Hei10-8028
[Patent Document 5] Japanese Kokai Publication Hei11-71110

SUMMARY OF INVENTION

Problems to be Solved by the Invention

In view of the situations described above, it is an object of the present disclosure to provide a method for producing a high-performance barium sulfate powder which is obtained by using inexpensive barium sulfide as a raw material, has a high whiteness, and can suppress the generation of volatile components such as sulfur components, and a barium sulfate powder.

Means for Solving Object

The present disclosure relates to a method for producing a barium sulfate powder comprising a step of heat treating a raw barium sulfate powders obtained by using barium sulfide as a raw material at 600 to 1300° C., wherein a retention time X (minutes) at a heat treatment temperature of t° C. is more than time expressed by the following general formula:

$$X \text{ (minutes)} = A \times 10^6 \times e^{(-0.015 \times t)}$$

A is 8 or more, and an upper limit of X is 3000 minutes in the formula.

The raw barium sulfate powder is preferably coated with at least one compound selected from the group consisting of silica, silica hydrates, and aluminum compounds.

The present disclosure relates to a barium sulfate powder which has an L value of 98.3 or more, an a value of −0.5 to 0.5, and a b value of 0 to 0.9 as for powder color, and shows a weight reduction of 0.5 wt % or less after being heated at 900° C. for 30 minutes, and has a sulfur content of 45 ppm or less.

The barium sulfate powder preferably has an average particle diameter of 0.01 to 50 μm.

The barium sulfate powder preferably has an L value of 99.0 or more, and a value of −0.2 to 0.1, and a b value of 0 to 0.7 as for powder color.

The barium sulfate powder is preferably obtained by heat treating raw barium sulfate obtained by using barium sulfide as a raw material.

Effects of the Invention

The method for producing a barium sulfate powder of the present disclosure uses barium sulfide being inexpensive and having a very low content of sodium and other components remaining in the particle and can improve conventional technical defects such as the lowering of whiteness degree and the generation of volatile components. The barium sulfate powder of the present disclosure is inexpensive, and can be used suitably for a filler of electronic devices and a back sheet of solar cells, a body of LED, a filler of reflection film of backlight unit provided LED as a light source, a filler of a resist ink, and a pigment for coating.

Further, a bad smell is reduced by reducing the content of sulfur components in barium sulfate so that an operating environment can be improved in the process of dispersing barium sulfate.

BRIEF DESCRIPTION OF THE DRAWINGS

FIG. 1 is a graph showing a relation between t and X.

DETAILED DESCRIPTION OF PREFERRED EMBODIMENTS

In the following, the present disclosure is described in detail about a method for producing the barium sulfate of the present disclosure having the above features.

A method for producing barium sulfate powder using barium sulfide as a raw material is not particularly limited but any known method may be used. More specifically, for example, the barium sulfate powder may be obtained by mixing an aqueous solution of sulfuric acid or sulfate (for example, sodium sulfate, ammonium sulfate, lithium sulfate, potassium sulfate, sodium hydrogen sulfate, lithium hydrogen sulfate, potassium hydrogen sulfate, aluminum sulfate, magnesium sulfate, and calcium sulfate) into barium sulfide aqueous solution. It is preferred to use sulfuric acid which does not generate byproduct salt for reducing impurities of barium sulfate powder.

A particle diameter of the raw barium sulfate powder is not particularly limited and powders of any particle diameter can improve the whiteness degree thereof and reduce the contained sulfur components by heat treating. However, the average particle diameter is preferably 0.01 to 50 μm when the powder is dispersed in a resin. The average particle diameter is preferably 0.1 to 10 μm when the barium sulfate powder after heat treatment is used as a filler of a back sheet for solar cells, and a reflection film of a backlight unit. The particle shape of the raw barium sulfate particle is not particularly limited but may include spherical shape, needle shape, plate shape, scaly shape, cube shape, petal shape, and arbitrary shapes and infinite shape. When the powder is used as a filler of a reflection film, spherical shape is preferred.

A sodium content of the raw barium sulfate powder is preferably 100 ppm or less. It is preferred that barium sulfate having a low sodium content can be obtained by using the barium sulfate powder having a reduced sodium content as a raw material. The sodium content is more preferably 50 ppm or less, still more preferably 20 ppm or less. The value of sodium content is measured by the following method disclosed in the example.

A chlorine content of the raw barium sulfate powder is preferably 100 ppm or less. It is preferred to use the barium sulfate powder having a reduced chlorine content because barium sulfate having a low chlorine content can be obtained. The chlorine content is more preferably 50 ppm or less, still more preferably 20 ppm or less. The value of chlorine content is measured by the following method disclosed in the example.

As the barium sulfate powder obtained by using barium sulfide as a raw material, commercial products may be used. The commercial product may include BARIACE B-54, BARIACE B-55, BARIACE B-65, BARIACE B-30, BARIACE B-31, BARIACE B-32, BARIACE B-33, BARIACE B-34, BARIACE B-35, BARIFINE BF-1, BARIFINE BF-10, BARIFINE BF-20, BARIFINE BF-40, and plate-shaped barium sulfate A (product names, manufactured by Sakai Chemical Industry Co., Ltd.).

The raw barium sulfate powder may be coated with at least one compound selected from the group consisting of silica, silica hydrates, and aluminum compounds. The restrain of particle growth and the reduction of sintering in heat treatment become possible by coating with such compound. Further, it is preferred because the affinity with water or resin can be improved to disperse easily. For improving the affinity with water or resin to disperse easily, inorganic compounds such as titanium oxide, and zinc oxide or organic-inorganic composite compounds such as silane coupling agents other than the above-mentioned compounds may be used for coating.

A method for coating with silica and silica hydrate is not particularly limited, but may include a method which comprises a step of adding sodium silicate as it is or an aqueous solution thereof to a water slurry of the raw barium sulfate powder, and a step of adding an acid such as sulfuric acid to precipitate silica and silica hydrate, and a method which comprises a step of dispersing the raw barium sulfate powder into an alcohol, water, or a mixed solvent of alcohol and water, a step of adding an alkoxysilane such as tetraethoxysilane, and a step of adding an acid or a base or heating to precipitate silica, and silica hydrate. After that, coated particles may be obtained by filtration and drying. The filtration may be performed by using a filter press, a decanter, a rotary filter and other apparatus and the drying may be performed by using heat or decompression drying apparatus to be used usually. The coated particles may be obtained by using, for example, a spray drying apparatus without filtration.

A coated amount of silica and silica hydrate is not particularly limited but preferably 0.1 to 10 wt % as silica. The lower limit is more preferably 0.5 wt % and the upper limit is more preferably 5 wt %. When the content is less than 0.1 wt %, the effect of suppressing the particle growth may not be achieved. Even if it is over 10 wt %, the effect of suppressing cannot be raised any more.

A method for coating with an aluminum compound is not particularly limited but may include a method which comprises a step of adding aluminum nitrate, aluminum sulfate or sodium aluminate as it is or in aqueous solution state to a slurry of the raw barium sulfate powder and adding an acid or an alkali to precipitate an aluminum compound. A coated amount of the aluminum compound is not particularly limited but is preferably 0.1 to 10 wt % as aluminum oxide. The lower limit is more preferably 0.5 wt %, and the upper limit is more preferably 5 wt %. When the content is less than 0.1 wt %, the effect of suppressing the particle growth may not be achieved. Even if it is over 10 wt %, the effect of suppressing cannot be raised any more.

It is needed that a heat treatment temperature in the method for producing the barium sulfate powder of the present disclosure is within a range of 600 to 1300° C. and a retention time is X (minutes) or more expressed by the formula 1 when the heat treatment temperature is t° C. selected from the above-mentioned range of 600 to 1300° C. The effect of reducing sulfur components begins to appear by retaining the temperature at 600° C. or more and the sulfur components may be reduced and the whiteness degree may be improved by retaining the temperature for the decided time. The t° C. in the formula expresses a heat treatment temperature in degrees Celsius and the e expresses Napier's constant.

$$X \text{ (minutes)} = A \times 10^6 \times e^{(-0.015 \times t)} \quad \text{Formula 1:}$$

In the formula, A is 8 or more.

A may be 8 or more, but preferably 14 or more, more preferably 20 or more. If the temperature is retained for time which is calculated when A is 8 or more, the sulfur content is reduced sufficiently and a barium sulfate powder having an extremely high whiteness degree can be obtained efficiently. That is, the characteristics of obtained barium sulfate powder may be changed according to the retention time calculated from the value of A. Therefore, the heat treatment temperature and the value of A are decided according to the purpose and the treatment time may be specified. The specified X is considered as the shortest treatment time and the treatment time may be decided. However, the retention time of less than 8 is not preferred because the above-mentioned characteristics may not be obtained.

The upper limit of the retention time is not particularly limited but preferably 3000 minutes or less from the viewpoint of production cost.

The heat treatment temperature is more preferably 750° C. or more, still more preferably 850° C. or more. As a specific example, when A=8, the retention time which is calculated from the formula 1 is 104 minutes or more if the temperature is 750° C., and the retention time is 23 minutes or more if the temperature is 850° C. When A=14, the retention time is 182 minutes or more if the temperature is 750° C., and the retention time is 41 minutes or more if the temperature is 850° C. When A=20, the retention time is 260 minutes or more if the temperature is 750° C., and the retention time is 58 minutes or more if the temperature is 850° C. It is preferred to retain for longer time than the time calculated in the case of increasing the value of A because the sulfur components may be reduced so that the barium sulfate powder having a high whiteness degree can be obtained. That is, because the characteristics of the barium sulfate powder may be predicted to a certain degree from the value of A, the value of A can be decided according to the purpose and the retention time can be decided based on the value of A. Further, for suppressing the particle growth and obtaining barium sulfate powder having a high whiteness degree, the heat treatment temperature is preferably 1100° C. or less.

The upper limit of A is 25 because X is 3000 minutes or less.

If the retention time is shorter than the time calculated form the above-mentioned formula, the effect of heat treatment may be insufficient to lower the L value, increase the b value as for powder color or corrode an electrode when the barium sulfate powder is used for an electronic devices. The upper limit of the retention time is not particularly limited but is preferably 3000 minutes or less, more preferably 1500 minutes or less, and still more preferably 500 minutes or less. There is no problem even if the heating is continued after the completion of the color phase improvement and the sulfur component reduction, but the continued heating after the effect is obtained increases the cost.

The heating may be performed by using an apparatus such as batch fixed furnaces including a shuttle furnace and continuous furnaces including a tunnel furnace and a rotary furnace. In the batch heating furnace, a temperature process of temperature raising and temperature lowering to the set temperature is not particularly limited as long as the heating at the above-mentioned temperature can be performed. It is expected that the content of sulfur components is reduced by heating during the temperature raising and the temperature lowering and the effect of heat treatment is achieved.

In the continuous furnace, the heating may be performed at the same temperature or at the different temperature according to each heating zone.

The heating may be performed under inert gas atmosphere such as nitrogen gas, argon gas, and carbon dioxide gas, but is preferably performed under the air atmosphere from the viewpoint of production cost. A reduction atmosphere such as carbon monoxide and hydrogen is not preferred because the barium sulfate is reduced to generate barium sulfide.

The powder after being heated may be pulverized by general methods such as a pin mill, a hammer mill, and a jet mill. The powder after the pulverization may be subjected to sieving or airflow classifying to adjust the particle diameter. Further, the pulverization and the classifying may be performed at the same time. The improvement of dispersibility is expected by doing such operations.

The particle diameter thereof may be adjusted by repulping the powder after being heated in water to disperse and general wet pulverizing such as a ball mill, and a beads mill.

Further, impurities may be reduced by water washing after the heat treatment. After the water washing, the barium sulfate powder can be obtained by doing general drying and/or pulverizing as mentioned above.

The powder after the heat treatment may be subjected to a coating treatment which is utilized generally for pigments such as inorganic coating treatments and organic coating treatments. The inorganic coating treatment is not particularly limited but may include a coating treatment using silica, alumina, and so on. The organic coating treatment may include an amine coating treatment, a silicone coating treatment, and an alcohol coating treatment. The amine to be used for coating is not particularly limited but may include diethanolamine, and triethanolamine. The silicone coating treatment is not particularly limited but monomethyl polysiloxane, and dimethyl polysiloxane may be used. The alcohol coating treatment is not particularly limited but trimethylolpropane, ethyleneglycol, glycerin, pentaerythrit, neopentyl glycol, polypropylene glycol, and polyethylene glycol may be used. In addition, carboxylic acid, a soap, a metallic soap, an organic ester, a silane, silane coupling agent, a silylating agent, and a siloxane may be used for coating. By doing such treatment, the affinity with a resin may be increased so that the obtained powder can be used suitably for a coating, an ink, a film, and a sheet.

The present disclosure relates to a barium sulfate powder having an L value of 98.3 or more, an a value of −0.5 to 0.5, and a b value of 0 to 0.9 as for powder color, showing a weight reduction of 0.5 wt % or less after being heated at 900° C. for 30 minutes, and having a sulfur content of 45 ppm or less.

The barium sulfate powder of the present disclosure hardly causes a problem that the insulating property is reduced and the electronic apparatus is corroded and is suitable for a filler of back sheet for solar cells, a filler of reflection film of backlight unit provided LED as a light source, and a filler of an ink or a coating.

The inventors can obtain new barium sulfate powder which satisfies all the above-mentioned physical properties by novel heat treating. That is, characteristics of the raw barium sulfate powder obtained by using barium sulfide as a raw material such as a color tone, a generation amount of volatile components are significantly changed by heat treatment under different conditions from the conventional conditions. The present disclosure is completed by finding that the luminance of the back sheet for solar cells and the reflection film of backlight unit provided LED as a light source can by improved and the corrosion of the electronic apparatus can be suppressed by such heat treating.

The effect is assumed to be achieved by the following mechanism; the sulfur components remaining in the particle are volatilized, and oxidized or decomposed by the heat treatment so that the amount of the sulfur components in the barium sulfate powder is reduced. It is needed to sufficiently reduce the content of the sulfur components and do the heat treatment under the specified conditions for increasing the whiteness degree. Further, it is preferred to do the heat treatment under the specified conditions because the problems of the powder aggregation and sintering, the excessive particle growth of powder, and the particle shape change derived from powder particle melting are not caused. In the present disclosure, it is found that the heat treatment under the specified conditions as mentioned above can solve the problem.

As for powder color of the barium sulfate powder of the present disclosure, the L value is 98.3 or more, the a value is −0.5 to 0.5, and the b value is 0 to 0.9. The barium sulfate powder may be used especially suitably for the fields requiring particles with high whiteness degree such as the fillers of back sheet for solar cells and reflection film of backlight unit provided LED as a light source because the barium sulfate powder is the particle having very high whiteness degree. In this case, it is preferred that the L value is 98.5 or more, the a value is −0.3 to 0.2, and the b value is 0 to 0.7, and more preferred that the L value is 99.0 or more, the a value is −0.2 to 0.1, and the b value is 0 to 0.7.

In the present disclosure, an L value, a value, and b value are measured by a measurement method which includes a step of molding a pellet containing a prescribed sample amount and a step of measuring by using a color meter. The L value is an index value of the brightness, and the higher L value expresses bright color. When a value is a large positive number, it is more reddish, and when the a value is a large negative number, it is more greenish. Further, when the b value is a large positive number, it is more yellowish, and when the b value is a large negative number, it is more bluish.

Further, the weight reduction of the barium sulfate powder of the present disclosure is preferably 0.5 wt % or less after being heated at 900° C. for 30 minutes, more preferably 0.3 wt % or less. That is, although impurities such as water other than the sulfur components exist in the barium sulfate powder produced by using barium sulfide as a raw material, the impurity content in the barium sulfate powder of the present disclosure is reduced by the heat treatment. Therefore, the above-mentioned parameters can be satisfied. Thereby, barium sulfate powder of the present disclosure hardly causes the problems of deterioration and corrosion of metal parts of electronic apparatus such as an electrode. On the other hand, the barium sulfate powder of which weight reduction after being heated at 900° C. for 30 minutes is within the above-mentioned range indicates that the powder was subjected to the heat treatment.

In addition, barium sulfate powders produced by using barium hydroxide or barium chloride as a raw material usually contain the impurities such as water of about 0.5 to 1% or more in terms of ignition loss. Therefore, the following problems may be generated: the metal parts such as electrodes of electronic apparatus are deteriorated and corroded, and the deterioration of resin is accelerated when the barium sulfate powder is used as a filler for a resin composition.

A particle diameter of the barium sulfate powder of the present disclosure is preferably 0.01 to 50 μm. The barium sulfate powder having the particle diameter within the above-mentioned range is preferred because the dispersibility thereof to a resin is high and the brightness of a back sheet for solar cells and a reflection film of backlight unit provided LED as a light source is improved. The lower limit is more preferably 0.05 μm, still more preferably 0.2 μm. The upper limit is more preferably 10 μm, still more preferably 1 μm. When a resin composition prepared by using the barium sulfate powder having a particle diameter within the above-mentioned range is processed into a film, a void is formed easily so that the brightness is assumed to be improved. In the present specification, the average particle diameter of the barium sulfate powder is measured by a method which comprises measuring long diameter of arbitrary 100 particles observed by SEM and calculating the average value thereof.

The particle diameter of the barium sulfate powder of the present disclosure can be adjusted by selecting the particle diameter of the raw barium sulfate powders, and selecting the temperature and the retention time in the heat treatment. Further, it is preferred to do common operations such as pulverizing and classification after the heat treatment.

The particle diameter and the particle shape of the barium sulfate powder of the present disclosure are not particularly limited but may include infinite shape, spherical shape, needle-like shape, plate-like shape, scale-like shape, cubic shape, petal-like shape and other shapes. The spherical shape is preferred when it is used for a reflection film.

A specific surface area of the barium sulfate powder of the present disclosure is preferably 1 to 40 $m^2/g$, more preferably 2 to 20 $m^2/g$, and still more preferably 3 to 10 $m^2/g$. The above-mentioned range is preferred because the dispersibility into a resin is improved and the void is formed easily in a resin to improve the whiteness degree. The specific surface area is measured by the following method mentioned in the example.

A sulfur content of the barium sulfate powder of the present disclosure is 45 ppm or less. The barium sulfate powder with the reduced sulfur content as mentioned above is preferred because the effects of suppressing the discoloration and reducing the generation amount of the volatile component can be achieved. The sulfur content is more preferably 25 ppm or less, still more preferably 15 ppm or less. The sulfur content is measured by the following method mentioned in the example.

The sulfur content range may be satisfied by heat treating the above-mentioned barium sulfate which is produced by using barium sulfide as a starting material under the prescribed condition.

A sodium content of the barium sulfate powder of the present disclosure is preferably 100 ppm or less. The barium sulfate powder with the reduced sodium content is preferred because the effects that malfunctions of electronic circuit derived from sodium is reduced and the insulation property of a resin composition containing the powder is improved can be achieved. The sodium content is more preferably 50 ppm or less, still more preferably 20 ppm or less. The sodium content is measured by the following method mentioned in the example.

The barium sulfate obtained by heat treating barium sulfate produced by using barium sulfide and sulfuric acid as a raw material under the prescribed condition usually satisfies the above-mentioned range of the sodium content if a sodium-containing compound is not used as a raw material. On the other hand, the sodium content of barium sulfate produced by using barium sulfide and sodium sulfate as a raw material is over the above-mentioned range.

A chlorine content of the barium sulfate powder of the present disclosure is preferably 100 ppm or less. The barium sulfate powder with the reduced chlorine content is preferred because the effect that the corrosion of electronic circuit derived from chlorine is reduced can be achieved. The chlorine content is more preferably 50 ppm or less, still more preferably 20 ppm or less. The chlorine content is measured by the following method mentioned in the example.

The barium sulfate obtained by heat treating barium sulfate produced by using barium sulfide as a raw material under the prescribed condition usually satisfies the above-mentioned range of the chlorine content because a chlorine-containing compound is not used as a raw material. On the other hand, the chlorine content of barium sulfate produced by using barium chloride as a raw material is over the above-mentioned range.

The barium sulfate with low chlorine and sodium content is especially preferred because the problems that the insulation property is reduced and the electronic apparatus is corroded are hardly generated.

The barium sulfate powder of the present disclosure may be blended into various resin compositions as a filler component. In this case, the resin to be used may be either a thermoplastic resin or a thermosetting resin, and examples thereof may include resins such as an epoxy resin, a phenol resin, a polyphenylene sulfide (PPS) resin, a polyester-based resin, polyamide, polyimide, polystyrene, polyethylene, polypropylene, polyvinyl chloride, polyvinylidene chloride, a fluororesin, polymethyl methacrylate, an ethylene/ethyl acrylate copolymer (EEA) resin, polycarbonate, polyurethane, polyacetal, polyphenylene ether, polyether imide, an acrylonitrile-butadiene-styrene copolymer (ABS) resin, a liquid crystal resin (LCP), a silicone resin and an acrylic resin.

When the barium sulfate powder of the present disclosure is blended in a resin composition, an amount is not particularly limited but preferably 5 to 70 wt % relative to the total amount of the resin composition. The lower limit is more preferably 40 wt %, and the upper limit is more preferably 60 wt %.

The barium sulfate powder of the present disclosure has a high whiteness degree, and contains a low volatile component content so that it can be used suitably for purposes requiring a high whiteness degree such as a back sheet for solar cells, a reflection film of a backlight unit of liquid crystal panel, and resin compositions for an ink, a coating, and an electronic parts. Further, if it is dispersed into a resin or a solvent, the deterioration of an operating environment by a sulfur component-derived bad smell is improved.

EXAMPLES

Hereinafter, the present disclosure will be explained with reference to examples. However, the present disclosure is not limited to these examples.

Comparative Example 1

BARIACE B-54 manufactured by Sakai Chemical Industry Co., Ltd., not subjected to a heat treatment was used in comparative example 1. The particle diameter of B-54 is 0.8 μm.

Comparative Example 2

BARIACE B-54 manufactured by Sakai Chemical Industry Co., Ltd., 100 g was weighed in a magnetic crucible. After the temperature in an electric furnace (type number FUM 332 PB) manufactured by ADVANTEC reached at 600° C., the crucible was set and the temperature was kept for 30 minutes to do the heat treatment. Then, the crucible was picked out and cooled at room temperature to obtain the barium sulfate powder.

Comparative Example 3

The barium sulfate powder was obtained by following the same procedure as that of comparative example 2 except that the temperature in the electric furnace was set at 700° C. and the treatment time was 30 minutes.

Comparative Example 4

The barium sulfate powder was obtained by following the same procedure as that of comparative example 2 except that the temperature in the electric furnace was set at 800° C. and the treatment time was 30 minutes.

Example 1

The barium sulfate powder was obtained by following the same procedure as that of comparative example 2 except that the temperature in the electric furnace was set at 800° C. and the treatment time was 240 minutes.

Example 2

The barium sulfate powder was obtained by following the same procedure as that of comparative example 2 except that the temperature in the electric furnace was set at 850° C. and the treatment time was 60 minutes.

Example 3

The barium sulfate powder was obtained by following the same procedure as that of comparative example 2 except that the temperature in the electric furnace was set at 900° C. and the treatment time was 30 minutes.

Comparative Example 5

BARIACE B-55 manufactured by Sakai Chemical Industry Co., Ltd., not subjected to a heat treatment was used in comparative example 5. The particle diameter of B-55 is 0.6 µm.

Comparative Example 6

BARIACE B-55 manufactured by Sakai Chemical Industry Co., Ltd., 100 g was weighed in a magnetic crucible. After the temperature in an electric furnace (type number FUM 332 PB) manufactured by ADVANTEC reached at 600° C., the crucible was set and the temperature was kept for 300 minutes to do the heat treatment. Then, the crucible was picked out and cooled at room temperature to obtain the barium sulfate powder.

Example 4

The barium sulfate powder was obtained by following the same procedure as that of comparative example 6 except that the temperature in the electric furnace was set at 600° C. and the treatment time was 2000 minutes.

Comparative Example 7

The barium sulfate powder was obtained by following the same procedure as that of comparative example 6 except that the temperature in the electric furnace was set at 700° C. and the treatment time was 180 minutes.

Example 5

The barium sulfate powder was obtained by following the same procedure as that of comparative example 6 except that the temperature in the electric furnace was set at 700° C. and the treatment time was 2000 minutes.

Comparative Example 8

The barium sulfate powder was obtained by following the same procedure as that of comparative example 6 except that the temperature in the electric furnace was set at 900° C. and the treatment time was 5 minutes.

Example 6

The barium sulfate powder was obtained by following the same procedure as that of comparative example 6 except that the temperature in the electric furnace was set at 900° C. and the treatment time was 20 minutes.

Example 7

The barium sulfate powder was obtained by following the same procedure as that of comparative example 6 except that the temperature in the electric furnace was set at 900° C. and the treatment time was 30 minutes.

Example 8

The barium sulfate powder was obtained by following the same procedure as that of comparative example 6 except that the temperature in the electric furnace was set at 900° C. and the treatment time was 360 minutes.

Example 9

BARIACE B-55 manufactured by Sakai Chemical Industry Co., Ltd., 100 g was weighed in a magnetic crucible and the crucible was set in an electric furnace (type number FUM 332 PB) manufactured by ADVANTEC. The temperature was raised until the temperature in the furnace reached to 1000° C. for 2 hours. After reaching at 1000° C., the temperature was kept for 30 minutes and cooled naturally. After cooling, the crucible was picked out to obtain the barium sulfate powder.

Example 10

The barium sulfate powder was obtained by following the same procedure as that of example 9 except that the temperature in the electric furnace was set at 1200° C.

Comparative Example 9

BARIACE B-30 manufactured by Sakai Chemical Industry Co., Ltd., not subjected to a heat treatment was used in comparative example 9. The particle diameter of B-30 is 0.2 µm. A viscosity of the aqueous dispersion prepared as mentioned later was measured by a Brookfield viscometer and the result was 230 mPa·s. Further, it was confirmed that a bad smell derived from hydrogen sulfide was generated from the dispersion.

Example 11

BARIACE B-30 manufactured by Sakai Chemical Industry Co., Ltd., 100 g was weighed in a magnetic crucible. After the temperature in an electric furnace (type number FUM 332 PB) manufactured by ADVANTEC reached at 900° C., the crucible was set and the temperature was kept for 30 minutes to do the heat treatment. Then, the crucible was picked out and cooled at room temperature to obtain the barium sulfate powder. A viscosity of the aqueous dispersion prepared as mentioned later was measured by a Brookfield viscometer and the result was 34 mPa·s. Further, it was confirmed that a bad smell derived from hydrogen sulfide was not generated from the dispersion.

Comparative Example 10

BARIFINE BF-20 manufactured by Sakai Chemical Industry Co., Ltd., not subjected to a heat treatment was used in comparative example 10. The particle diameter of BF-20 is 0.1 µm.

Example 12

BARIFINE BF-20 manufactured by Sakai Chemical Industry Co., Ltd., 100 g was weighed in a magnetic crucible. After the temperature in an electric furnace (type number FUM 332 PB) manufactured by ADVANTEC reached at 900° C., the crucible was set and the temperature was kept for 30 minutes to do the heat treatment. Then, the crucible was picked out and cooled at room temperature to obtain the barium sulfate powder.

Comparative Example 11

Plate-shaped barium sulfate A manufactured by Sakai Chemical Industry Co., Ltd., was used in comparative example 11. The particle diameter of plate-shaped barium sulfate A is 8.2 μm.

Example 13

Plate-shaped barium sulfate A manufactured by Sakai Chemical Industry Co., Ltd., 100 g was weighed in a magnetic crucible. After the temperature in an electric furnace (type number FUM 332 PB) manufactured by ADVANTEC reached at 900° C., the crucible was set and the temperature was kept for 30 minutes to do the heat treatment. Then, the crucible was picked out and cooled at room temperature to obtain the barium sulfate powder.

Comparative Example 12

Barite 3000 g and coke 300 g were weighed in a crucible made of silicon carbide and the crucible was covered with the lid. Then, it was set in an electric furnace (type number FUM 332 PB) manufactured by ADVANTEC. Next, a reduction roasting was performed by raising the temperature to 1000° C. for 2 hours and keeping at 1000° C. for 2 hours. The roasted substance after being cooled was dispersed in ion exchanged water 1000 ml of 60° C. to dissolve the barium sulfide component. The insoluble component was filtered out by using 5C filter paper and ion exchanged water was added thereto to obtain barium sulfide aqueous solution of 100 g/l. Barium sulfide aqueous solution 1000 ml and 580 ml of sulfuric acid of 100 g/l were mixed in 2L beaker to obtain a barium sulfate slurry. To the reaction slurry, 9 g sodium aluminate of 15 wt % was added and the pH of the slurry was adjusted to 8 by using sulfuric acid of 10 g/l. The slurry was filtered through 5C filter paper, water washed by ion exchanged water, and dried in box type thermostatic bath at 150° C. The sample after being dried was pulverized by an airflow type pulverizer SJ-500 manufactured by Nissin engineering INC. to obtain the barium sulfate powder. The particle diameter of obtained barium sulfate was 0.4 μm.

Example 14

Barite 3000 g and coke 300 g were weighed in a crucible made of silicon carbide and the crucible was covered with the lid. Then, it was set in an electric furnace (type number FUM 332 PB) manufactured by ADVANTEC. Next, a reduction roasting was performed by raising the temperature to 1000° C. for 2 hours and keeping at 1000° C. for 2 hours. The roasted substance after being cooled was dispersed in ion exchanged water 1000 ml of 60° C. to dissolve the barium sulfide component. The insoluble component was filtered out by using 5C filter paper and ion exchanged water was added thereto to obtain barium sulfide aqueous solution of 100 g/l. Barium sulfide aqueous solution 1000 ml and 580 ml of sulfuric acid of 100 g/l were mixed in 2L beaker to obtain a barium sulfate slurry. To the reaction slurry, 9 g sodium aluminate of 15 wt % was added and the pH of the slurry was adjusted to 8 by using sulfuric acid of 10 g/l. The slurry was filtered through 5C filter paper, water washed by ion exchanged water, and dried in box type thermostatic bath at 150° C. The sample after being dried 100 g was weighed in the crucible, and the crucible was set in the electric furnace manufactured by ADVANTEC (type number FUM 332 PB) after the temperature in the furnace reached to 900° C. and heated by keeping the temperature for 30 minutes. After that, the crucible was taken out and cooled at room temperature. The sample after being cooled was pulverized by an airflow type pulverizer SJ-500 manufactured by Nissin engineering INC. to obtain the barium sulfate powder. The particle diameter of obtained barium sulfate was 0.4 μm.

Comparative Example 13

Barite 3000 g and coke 300 g were weighed in a crucible made of silicon carbide and the crucible was covered with the lid. Then, it was set in an electric furnace (type number FUM 332 PB) manufactured by ADVANTEC. Next, a reduction roasting was performed by raising the temperature to 1000° C. for 2 hours and keeping at 1000° C. for 2 hours. The roasted substance after being cooled was dispersed in ion exchanged water 1000 ml of 60° C. to dissolve the barium sulfide component. The insoluble component was filtered out by using 5C filter paper and ion exchanged water was added thereto to obtain barium sulfide aqueous solution of 100 g/l. Barium sulfide aqueous solution 1000 ml and 580 ml of sulfuric acid of 100 g/l were mixed in 2L beaker to obtain a barium sulfate slurry. To the reaction slurry, 4 g sodium silicate of 30 wt % was added and the pH of the slurry was adjusted to 8 by using sulfuric acid of 10 g/l. The slurry was filtered through 5C filter paper, water washed by ion exchanged water, and dried in box type thermostatic bath at 150° C. The sample after being dried was pulverized by an airflow type pulverizer SJ-500 manufactured by Nissin engineering INC. to obtain the barium sulfate powder. The particle diameter of obtained barium sulfate was 0.4 μm.

Example 15

Barite 3000 g and coke 300 g were weighed in a crucible made of silicon carbide and the crucible was covered with the lid. Then, it was set in an electric furnace (type number FUM 332 PB) manufactured by ADVANTEC. Next, a reduction roasting was performed by raising the temperature to 1000° C. for 2 hours and keeping at 1000° C. for 2 hours. The roasted substance after being cooled was dispersed in ion exchanged water 1000 ml of 60° C. to dissolve the barium sulfide component. The insoluble component was filtered out by using 5C filter paper and ion exchanged water was added thereto to obtain barium sulfide aqueous solution of 100 g/l. Barium sulfide aqueous solution 1000 ml and 580 ml of sulfuric acid of 100 g/l were mixed in 2L beaker to obtain a barium sulfate slurry. To the reaction slurry, 4 g sodium silicate of 30 wt % was added and the pH of the slurry was adjusted to 8 by using sulfuric acid of 10 g/l. The slurry was filtered through 5C filter paper, water washed by ion exchanged water, and dried in box type thermostatic bath at 150° C. The sample after being dried 100 g was weighed in the crucible, and the crucible was set in the electric furnace manufactured by ADVANTEC (type number FUM 332 PB) after the temperature in the furnace reached to 900° C. and heated by keeping the temperature for 30 minutes. After that, the crucible was taken out and cooled at room temperature. The sample after being cooled was pulverized by an airflow type pulverizer SJ-500 manufactured by Nissin engineering INC. to obtain the barium sulfate powder. The particle diameter of obtained barium sulfate was 0.4 μm.

The barium sulfate powders obtained in the above-mentioned examples were measured according to the following methods. The results are shown in tables 1 to 3.

(Measurement of Color Phase (L, a, b, and W))

For measurement of color phase, a test piece was prepared by putting the powder 7.5 g into an aluminum ring with the outside diameter of 44 mm, the inner diameter of 40 mm, and the height of 5 mm, and molding by using a tablet molding press manufactured by Maekawa Testing Machine MFG Co., LTD. (type number BRE-33) at the pressure of 120 Mpa. The prepared test piece was measured by using a spectrophotometer manufactured by Nippon densyoku industries Co., LTD. (type number SPECTRO COLOR METER SE-2000).

(Measurement of Weight Reduction after being Heated at 900° C. for 30 Minutes (Ignition Loss))

A sample 2 g was weighed accurately up to 0.1 mg in a magnetic crucible of which weight is already known and the crucible was put in an electric furnace manufactured by ADVANTEC set at 900° C. and heated for 30 minutes. The crucible was taken from the electric furnace and cooled naturally in a desiccator. Then, the crucible was weighed accurately up to 0.1 mg and the weight reduction after being heated at 900° C. for 30 minutes was calculated from the weight difference before and after being heated.

(Calculation of Particle Diameter (SEM Diameter))

The particles were photographed with a magnification of 2000 or 20000 by a scanning electron microscopy manufactured by JEOL Ltd. (type number JSM-6510A) and the length of the longest side of the particle was decided as the particle diameter. The particle diameters of 100 particles were randomly measured and the average value thereof was decided as the particle diameter of the sample.

(Measurement of Sulfur Content)

A sample 5 g and 50 ml of sodium hydroxide aqueous solution of 40 g/l were added in a flask equipped with a stopper part and stirred at 80° C. for 30 minutes. Concentrated hydrochloric acid 5 ml was added after 25 ml of iodine of 0.01 mol/l was added. Then, starch was used as an indicator and sodium thiosulfate of 0.005 mol/l was used to perform titration. A blank test was done under the condition that the sample was not added, and the sulfur content in the sample was calculated according to the following formula.

Sulfur content (ppm)=16×(titration amount of blank (ml)−titration amount of sample (ml))

(Measurement of Specific Surface Area (SSA))

Macsorb (type number HM-1220) manufactured by Mountech was used. A sample amount was 0.5 g, and the measurement was done after degassing treatment at 200° C. for 15 minutes.

(Measurement of Na Content)

A sample 5 g and ion exchanged water 40 ml were added in a pressure proof vessel, and heated in a thermostatic bath at 121° C. for 24 hours. After being heated, the pressure proof vessel was taken out and the sample was filtered through 5C filter paper. Then, Na amount in the filtrate was measured by ion chromatography IC-2001 manufactured by Tosoh Corporation.

(Measurement of Cl Content)

A sample 5 g and ion exchanged water 40 ml were added in a pressure proof vessel, and heated in a thermostatic bath at 121° C. for 24 hours. After being heated, the pressure proof vessel was taken out and the sample was filtered through 5C filter paper. Then, Cl amount in the filtrate was measured by ion chromatography IC-2001 manufactured by Tosoh Corporation.

(Silver Discoloration Test)

Barium sulfate powder 3 g or the resin composition prepared in the example 10 g was put in a glass sample bottle with an inner volume of 100 mL and a lid was closed to seal the bottle. The sample bottle was put in thermostatic and humidistatic container in which the condition was stabilized at 85° C.×85 RH % in advance. After confirming that the temperature and the humidity inside the thermostatic and humidistatic container become constant, a slide glass to which the silver paste had been applied (DOTITE D550 manufactured by Fujikura kasei Co., Ltd.) was put in a sample bottle under the atmosphere of the thermostatic and humidistatic container and the lid was closed to seal. After 72 hours, a slide glass was taken out from the sample bottle, and the discoloration degree of the silver paste was confirmed visually. The discoloration of only the silver paste was evaluated as a blank. It was appreciated as ○ when the discoloration degree is equal to the blank. It was appreciated as Δ when the discoloration degree was slightly inferior to the blank. It was appreciated as x when the discoloration degree was inferior to the blank.

The object of silver discoloration test is to evaluate the corrosion resistance of electrode.

(Test for Confirming Viscosity and Bad Smell in Preparing Aqueous Dispersion)

Barium sulfate powder sample 56 g, purified water 24 g, POIZ 520 (manufactured by KAO Corporation; polycarboxylic acid type dispersant) 1.5 g, and zirconia beads having the diameter of 0.3 mm of 100 g were put in a glass bottle and dispersed for 30 minutes by a paint shaker. Immediately after the completion of dispersing, the lid of the glass bottle was opened and the generation of a bad smell was confirmed. After confirming the generation of bad smell, the beads were removed and the viscosity was measured by using a B-type viscosity with a rotor M2 at 60 rpm.

(Measurement of Color Phase of Resin Composition Sheet)

EEA resin (REXPEARL A1150 manufactured by Japan Polyethylene Corporation, Ltd.) 30 g and barium sulfate powder 30 g were kneaded in LABO PLASTMILL (manufactured by TOY® SEIKI SEISAKU-SYO, Ltd.) at the number of rotations of 40 rpm and at 150° C. for 10 minutes. After the kneaded article was taken out, it was put on the center of a mold plate made of stainless having a thickness of 2 mm (150 mm×200 mm), and the mold plate was hold from the upper and lower sides by two plates made of stainless having a thickness of 2 mm (200 mm×300 mm). Then, the test plate was set on the sample board of mini TEST PRESS-10 (manufactured by TOY® SEIKI SEISAKU-SYO, Ltd.), and kept at 160° C., and 0.5 MPa for 2 minutes, further kept at 160° C., and 5 MPa for 2 minutes. After that, it was kept at 160° C., and 25 MPa for 3 minutes. Next, it was cooled at 25 MPa for 5 minutes by holding between water-cooling plates to obtain a resin composition sheet. The color phase of the resin composition sheet is measured by a spectrophotometer manufactured by Nippon densyoku industries Co., LTD. (type number SPECTRO COLOR METER SE-2000).

TABLE 1

| | Temperature (° C.) | Time (min.) | L | a | b | W | ΔL | Δb | ΔW | SSA (m²/g) | SEM diameter (μm) | Sulfur contennt (ppm) | Ignition loss (%) | Silver discoloration test | Na (ppm) | Cl (ppm) |
|---|---|---|---|---|---|---|---|---|---|---|---|---|---|---|---|---|
| Compar. ex. 1 | | | 99.2 | −0.4 | 1.1 | 98.6 | | | | 4.2 | 0.8 | 90 | 1.5 | X | 10 | 5 |
| Compar. ex. 2 | 600 | 30 | 98.1 | −0.9 | 1.6 | 97.3 | −1.1 | 0.5 | −1.2 | 4.2 | 0.8 | 43 | 0.5 | X | | |
| Compar. ex. 3 | 700 | 30 | 97.7 | −1.7 | 4.2 | 94.9 | −1.5 | 3.1 | −3.7 | 4.2 | 0.8 | 21 | 0.1 | Δ | | |
| Compar. ex. 4 | 800 | 30 | 97.6 | −1.4 | 3.2 | 95.8 | −1.6 | 2.0 | −2.8 | 4.3 | 0.8 | 16 | 0.1 | Δ | | |
| Ex. 1 | 800 | 240 | 99.2 | −0.2 | 0.6 | 99.0 | 0.0 | −0.5 | 0.4 | 3.7 | 0.8 | 3 | 0.1 | ○ | | |
| Ex. 2 | 850 | 60 | 99.3 | 0.0 | 0.4 | 99.2 | 0.2 | −0.7 | 0.7 | 3.7 | 0.8 | 6 | 0.2 | ○ | | |
| Ex. 3 | 900 | 30 | 99.3 | −0.1 | 0.5 | 99.1 | 0.1 | −0.6 | 0.6 | 3.5 | 0.8 | 7 | 0.2 | ○ | | |

TABLE 2

| | Temperature (° C.) | Time (min.) | L | a | b | W | ΔL | Δb | ΔW | SSA (m²/g) | SEM diameter (μm) | Sulfur contennt (ppm) | Ignition loss (%) | Silver discoloration test | Na (ppm) | Cl (ppm) |
|---|---|---|---|---|---|---|---|---|---|---|---|---|---|---|---|---|
| Compar. ex. 5 | | | 98.6 | −0.4 | 1.3 | 98.1 | | | | 4.5 | 0.6 | 76 | 1.4 | X | 12 | 4 |
| Compar. ex. 6 | 600 | 300 | 98.5 | −1.1 | 2.8 | 96.7 | −0.1 | 1.4 | −1.4 | 4.4 | 0.6 | 20 | 0.3 | Δ | | |
| Ex. 4 | 600 | 2000 | 98.9 | −0.4 | 0.9 | 98.4 | 0.3 | −0.4 | 0.4 | 4.4 | 0.6 | 7 | 0.1 | ○ | | |
| Compar. ex. 7 | 700 | 180 | 97.4 | −1.9 | 4.3 | 94.6 | −1.2 | 3.0 | −3.5 | 4.0 | 0.6 | 10 | 0.1 | Δ | | |
| Ex. 5 | 700 | 2000 | 99.3 | −0.2 | 0.9 | 98.8 | 0.7 | −0.4 | 0.8 | 4.0 | 0.6 | 5 | 0.1 | ○ | | |
| Compar. ex. 8 | 900 | 5 | 98.3 | −1.2 | 3.2 | 96.2 | −0.3 | 1.9 | −1.9 | 4.0 | 0.6 | 19 | 0.1 | Δ | | |
| Ex. 6 | 900 | 20 | 99.3 | −0.3 | 0.9 | 98.8 | 0.7 | −0.4 | 0.7 | 3.9 | 0.7 | 2 | 0.1 | ○ | | |
| Ex. 7 | 900 | 30 | 99.5 | −0.1 | 0.5 | 99.3 | 0.9 | −0.8 | 1.2 | 3.8 | 0.7 | 8 | 0.1 | ○ | 53 | 6 |
| Ex. 8 | 900 | 360 | 99.6 | 0.0 | 0.3 | 99.5 | 1.0 | −1.0 | 1.5 | 2.2 | 0.8 | 4 | 0.1 | ○ | | |
| Ex. 9 | 1000 | 30 | 99.6 | −0.1 | 0.3 | 99.4 | 1.0 | −1.0 | 1.4 | 2.3 | 0.8 | 2 | 0.1 | ○ | | |
| Ex. 10 | 1200 | 30 | 98.4 | −0.2 | 0.5 | 98.3 | −0.2 | −0.81 | 0.3 | 2.0 | 1.4 | 2 | 0.1 | ○ | | |

TABLE 3

| | Temperature (° C.) | Time (min.) | L | a | b | W | ΔL | Δb | ΔW | SSA (m²/g) | SEM diameter (μm) | Sulfur contennt (ppm) | Ignition loss (%) | Silver discoloration test |
|---|---|---|---|---|---|---|---|---|---|---|---|---|---|---|
| Compar. ex. 9 | | | 96.7 | −1.2 | 1.2 | 96.3 | | | | 18.3 | 0.2 | 150 | 3.5 | X |
| Ex. 11 | 900 | 30 | 99.1 | −0.1 | 0.4 | 99.1 | 2.4 | −0.8 | 2.8 | 14.5 | 0.2 | 8 | 0.2 | ○ |
| Compar. ex. 10 | | | 89.4 | −3.6 | 2.2 | 88.6 | | | | 33.5 | 0.1 | 1700 | 2.6 | X |
| Ex. 12 | 900 | 30 | 99.1 | 0.0 | 0.4 | 99.0 | 9.8 | −1.8 | 10.5 | 4.0 | 0.3 | 4 | 0.1 | ○ |
| Compar. ex. 11 | | | 96.6 | −0.7 | 2.4 | 95.8 | | | | 2.6 | 8.2 | 54 | 1.8 | X |
| Ex. 13 | 900 | 30 | 98.3 | −0.1 | 0.8 | 98.1 | 1.7 | −1.6 | 2.3 | 2.0 | 5.8 | 2 | 0.1 | ○ |
| Compar. ex. 12 | | | 98.5 | −0.6 | 1.6 | 97.7 | | | | 10.8 | 0.4 | 52 | 1.8 | X |
| Ex. 14 | 900 | 30 | 99.3 | 0.0 | 0.5 | 99.0 | 0.8 | −2.1 | 1.3 | 7.3 | 0.4 | 17 | 0.2 | ○ |
| Compar. ex. 13 | | | 98.8 | −0.5 | 1.6 | 98.0 | | | | 8.8 | 0.4 | 53 | 1.6 | X |
| Ex. 15 | 900 | 30 | 99.2 | 0.0 | 0.4 | 99.1 | 0.4 | −1.3 | 1.1 | 6.7 | 0.4 | 21 | 0.3 | ○ |

TABLE 4

| | Aqueous dispersion test | | Resin composition test (silver discoloration test·color phase) | | | | |
|---|---|---|---|---|---|---|---|
| Sample | Viscosity mPa.s | Bad smell derived from hydrogen sulfide | silver discoloration test | Color phase L | Color phase a | Color phase b | Color phase W |
| Compar. Ex. 5 | 39 | Presence | X | 90.9 | −1.1 | 2 | 90.6 |

TABLE 4-continued

| | Aqueous dispersion test | | Resin composition test (silver discoloration test·color phase) | | | | |
|---|---|---|---|---|---|---|---|
| Sample | Viscosity mPa.s | Bad smell derived from hydrogen sulfide | silver discoloration test | Color phase L | Color phase a | Color phase b | Color phase W |
| Ex. 7 | 20 | Absence | ○ | 90.9 | −0.5 | −0.5 | 90.9 |
| Compar. Ex. 9 | 230 | Presence | X | 85.2 | −4.7 | 4.6 | 83.8 |
| Ex. 11 | 34 | Absence | ○ | 88.1 | −0.9 | −1.5 | 88.0 |

Comparative Example 14 (Barium Sulfate Prepared by Using Barium Chloride and Sodium Sulfate as Staring Material)

Barium chloride of 200 g/L 1000 ml and 800 ml of sodium sulfate of 200 g/l were mixed in a 3L beaker to obtain a slurry of barium sulfate. The reaction slurry was filtered through % C filter paper, water washed by deionized water, and dried by box type drier at 150° C. The dried sample was pulverized by an airflow type pulverizer SJ-500 manufactured by Nissin engineering INC. to obtain the barium sulfate powder. The result is as follows; L=98.9, a=−0.1, b=0.4, W=98.8, specific surface area=4, SEM diameter 0.4 μm, sulfur content 2 ppm, ignition loss=0.67 wt %, Na=150 ppm, and Cl=200 ppm. Compared to the barium sulfate of the present disclosure, the sodium content and the chlorine content is larger.

Comparative Example 15 (Barium Sulfate Prepared by Using Barium Sulfide and Sodium Sulfate as Staring Material)

Barite 3000 g and coke 300 g were put in a crucible made of silicon carbide and the crucible was covered with the lid. Then, it was set in an electric furnace (type number FUM 332 PB) manufactured by ADVANTEC. Next, a reduction roasting was performed by raising the temperature to 1000° C. for 2 hours and keeping at 1000° C. for 2 hours. The roasted substance after being cooled was dispersed in ion exchanged water 1000 ml of 60° C. to dissolve the barium sulfide component. The insoluble component was filtered out by using 5C filter paper and ion exchanged water was added thereto to obtain barium sulfide aqueous solution of 100 g/l. Barium sulfide aqueous solution 1000 ml and 600 ml of sodium sulfate of 100 g/l were mixed in a 3L beaker to obtain a slurry of barium sulfate. The reaction slurry was filtered through 5C filter paper, water washed by deionized water, and dried by box type drier at 150° C. The dried sample was pulverized by an airflow type pulverizer SJ-500 manufactured by Nissin engineering INC. to obtain the barium sulfate powder.

The result is as follows; L=98.0, a=−0.2, b=1.4, W=97.6, specific surface area=4.5, SEM diameter 0.5 μm, sulfur content 21 ppm, ignition loss=0.55 wt %, Na=92 ppm, and Cl=7 ppm. Compared to the barium sulfate of the present disclosure, the whiteness degree is lower and the sodium content is larger.

From the results of the examples and comparative examples, it is clear that the barium sulfate powder of the present disclosure has a high whiteness degree and low volatile content under heating. As shown in table 4, the a value and the b value of the resin composition prepared by using the barium sulfate powder of the present disclosure approach to 0 so that the whiteness degree becomes high. It is clear that the barium sulfate powder of the present disclosure improve the color of the resin composition and solve the defects derived from sulfur component. Further, the sulfur content is reduced dramatically, and the chlorine content and the sodium content are lower than that of the barium sulfate prepared by using barium chloride as a raw material so that it is expected that problems such as a metal corrosion and a bad smell hardly occur. Comparing the dispersion of the barium sulfate powder before the heat treatment with the dispersion of the powder after the heat treatment, the viscosity is greatly reduced. Therefore, if a dispersion with a low viscosity is required, it is expected that an amount of dispersant to be separately added may be reduced.

(Relationship Between X and t)

Plots of X and t in each example on a graph are shown in FIG. 1.

In FIG. 1, the relationships between X and t of each example are plotted and three straight lines are drawn in the formula.

The three straight lines show the cases if A=8, A=14, or A=20 respectively, in the formula:

$$X \text{ (min.)} = A \times 10^6 \times e^{(-0.015 \times t)}$$

From the results of FIG. 1, it is clear that barium sulfate powders having an especially preferred characteristics can be obtained by heat treating in which the relationship between retention time and temperature is defined according to the straight line expressed by the formula:

$$X \text{ (min.)} = A \times 10^6 \times e^{(-0.015 \times t)} \quad (A \text{ is 8 or more})$$

From the results of FIG. 1 and tables 1 to 3, it is obvious that barium sulfate powders having an especially superior characteristics can be obtained, when the retention time in the heat treatment satisfies the general formula, for example examples 8 and 9 among the examples.

INDUSTRIAL APPLICABILITY

The barium sulfate powder of the present disclosure may be used suitably as a compounded component for resin compositions such as various films, sheets, fibers, coatings, and inks. It may be used especially suitably for a back sheet of solar cells, and a filler of a reflection film of a backlight unit using a LED as a source of light.

The invention claimed is:

1. A method for producing a barium sulfate powder comprising a step of heat treating a raw barium sulfate powders obtained by using barium sulfide as a raw material at 600 to 1300° C., wherein a retention time X (minutes) at a heat treatment temperature of t° C. is more than time expressed by the following general formula:

$$X \text{ (minutes)} = A \times 10^6 \times e^{(-0.015 \times t)}$$

A is 8 or more, and an upper limit of X is 3000 minutes in the formula.

2. The method for producing a barium sulfate powder according to claim 1, wherein the raw barium sulfate powder is coated with at least one compound selected from the group consisting of silica, silica hydrates, and aluminum compounds.

3. The method for producing barium sulfate powders according to claim 1, wherein the raw barium sulfate powder has a chlorine content of 100 ppm or less, and a sodium content of 100 ppm or less.

4. A barium sulfate powder which has an L value of 98.3 or more, an a value of −0.5 to 0.5, and a b value of 0 to 0.9 as for powder color, and shows a weight reduction of 0.5 wt % or less after being heated at 900° C. for 30 minutes, and has a sulfur content of 45 ppm or less.

5. The barium sulfate powder according to claim 4, which has an average particle diameter of 0.01 to 50 μm.

6. The barium sulfate powder according to claim 4 for a reflection film, which has an L value of 99.0 or more, an a value of −0.2 to 0.1, and a b value of 0 to 0.7 as for powder color.

7. The barium sulfate powder according to claim 4, which has a chlorine content of 100 ppm or less, and a sodium content of 100 ppm or less.

8. The barium sulfate powder according to claim 4, which is obtained by heat treating raw barium sulfate obtained by using barium sulfide as a raw material.

9. The barium sulfate powder according to claim 5 for a reflection film, which has an L value of 99.0 or more, an a value of −0.2 to 0.1, and a b value of 0 to 0.7 as for powder color.

10. The barium sulfate powder according to claim 5, which has a chlorine content of 100 ppm or less, and a sodium content of 100 ppm or less.

11. The barium sulfate powder according to claim 6, which has a chlorine content of 100 ppm or less, and a sodium content of 100 ppm or less.

12. The barium sulfate powder according to claim 5, which is obtained by heat treating raw barium sulfate obtained by using barium sulfide as a raw material.

13. The barium sulfate powder according to claim 6, which is obtained by heat treating raw barium sulfate obtained by using barium sulfide as a raw material.

14. The barium sulfate powder according to claim 7, which is obtained by heat treating raw barium sulfate obtained by using barium sulfide as a raw material.

* * * * *